Figure 10:
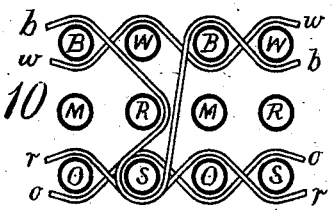

(Model.)
T. B. DORNAN.
INGRAIN CARPET FABRIC.
No. 548,747. Patented Oct. 29, 1895.
4 Sheets—Sheet 1.
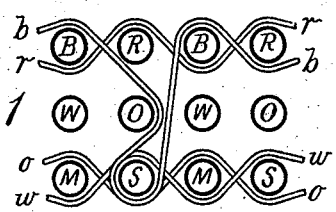
Fig. 1
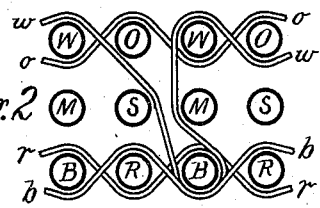
Fig. 2
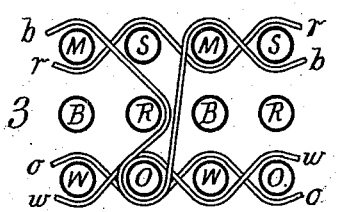
Fig. 3
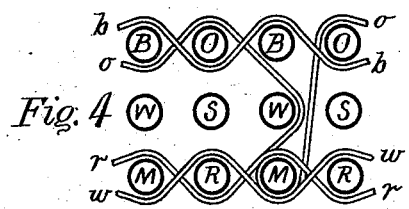
Fig. 4
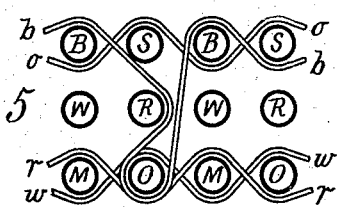
Fig. 5
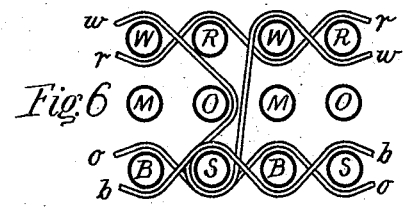
Fig. 6
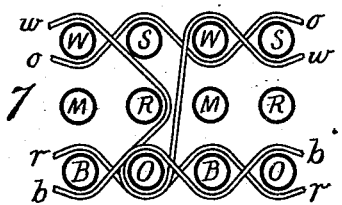
Fig. 7
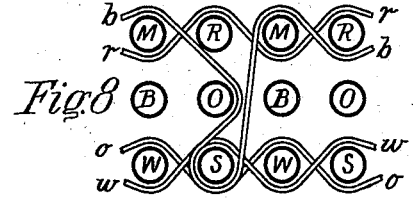
Fig. 8
Fig. 9
WITNESSES:
Evarts L. Prentiss
Albert Bjarck.
INVENTOR
Thomas Benton Dornan
BY Henry A. Williams
ATTORNEY.

(Model.)

T. B. DORNAN.
INGRAIN CARPET FABRIC.

No. 548,747. Patented Oct. 29, 1895.

4 Sheets—Sheet 2.

WITNESSES:
Harry Levison
Herbert H. Gibbs.

INVENTOR
Thomas Benton Dornan
BY
Henry D. Williams
ATTORNEY (Model.)　　　　　　　　　　　　　　　　　　　4 Sheets—Sheet 3.
T. B. DORNAN.
INGRAIN CARPET FABRIC.

No. 548,747.　　　　　　　　　　Patented Oct. 29, 1895.

WITNESSES:
Evarts J. Prentiss
Albert Barck.

INVENTOR
Thomas Benton Dornan
BY
Henry D. Williams
ATTORNEY.

UNITED STATES PATENT OFFICE.

THOMAS BENTON DORNAN, OF PHILADELPHIA, PENNSYLVANIA.

INGRAIN CARPET FABRIC.

SPECIFICATION forming part of Letters Patent No. 548,747, dated October 29, 1895.

Application filed April 24, 1895. Serial No. 546,964. (Specimens.)

*To all whom it may concern:*

Be it known that I, THOMAS BENTON DORNAN, a citizen of the United States, and a resident of the city and county of Philadelphia, State of Pennsylvania, have invented certain new and useful Improvements in Ingrain Carpet Fabrics, of which the following is a specification, reference being had to the accompanying drawings, forming part hereof.

This invention relates to fabrics such as are designated "ingrain carpet fabrics," and more particularly to that class of such fabrics in which the weft-threads are arranged in sets of six weft-threads each and are used in conjunction with warp-threads arranged in sets having a less number to a set than the weft-threads. Fabrics having six weft-threads to the set and four warp-threads to the set have heretofore been made; but it has not heretofore been practicable to obtain in such a fabric pure color effects to the full extent of the variations possible in a set of six weft-threads and at the same time to sufficiently and in a satisfactory manner tie the plies together, and such fabrics have been in other respects objectionable.

In the improved fabric embodying my invention the full number of different color effects possible with a different color for each of the six weft-threads of a set may be obtained—viz., fifteen different color effects—and each color effect will be pure or free from grinning and gazing of other threads than those designed to appear on the surface of the fabric—that is to say, any weft-thread of the first three weft-threads of a set may be combined not only with any weft-thread of the second three weft-threads of the set, but also with each other weft-thread of the first three weft-threads, and so, also, any weft-thread of the second three weft-threads of a set may be combined with any weft-thread of the first three weft-threads of the set or with each other weft-thread of the second three weft-threads, and the color effects will be pure and the plies will be at all places sufficiently tied together to produce a strong and durable fabric.

In the improved fabric embodying my invention the weft-threads are arranged in three planes or layers, so that in each set of six weft-threads there are two weft-threads in the upper plane or ply and two weft-threads in the middle plane and two weft-threads in the lower plane or ply, and two warp-threads are interwoven about the weft-threads of the upper plane or ply to form the upper surface of the fabric, and two warp-threads are interwoven about the weft-threads of the lower plane or ply to form the lower surface of the fabric, and the tying together of the upper ply and the lower ply is effected by passing a warp-thread from one outer ply, as the upper ply, to the other outer ply, as the lower ply, and binding a weft-thread of that ply and back again, and this tying together of the plies is repeated at definite intervals transversely and longitudinally of the fabric; but to describe my invention more particularly I will now refer to the accompanying drawings, illustrating portions of fabrics embodying my invention.

Figure 16:
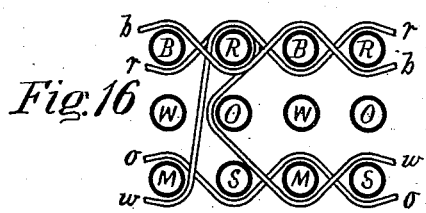
Figure 17:
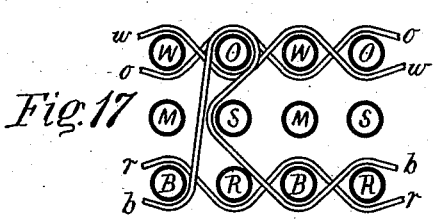
Figure 18:
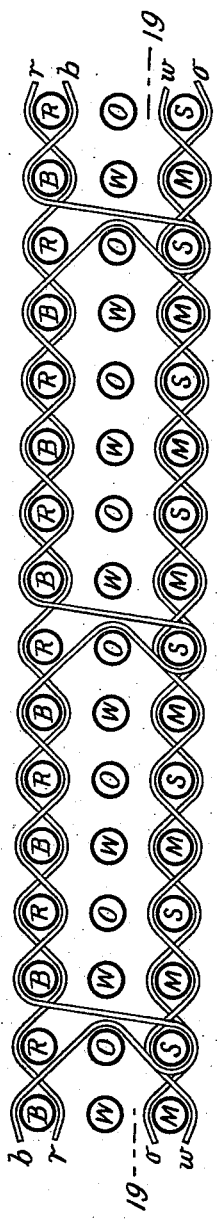
Figure 19:
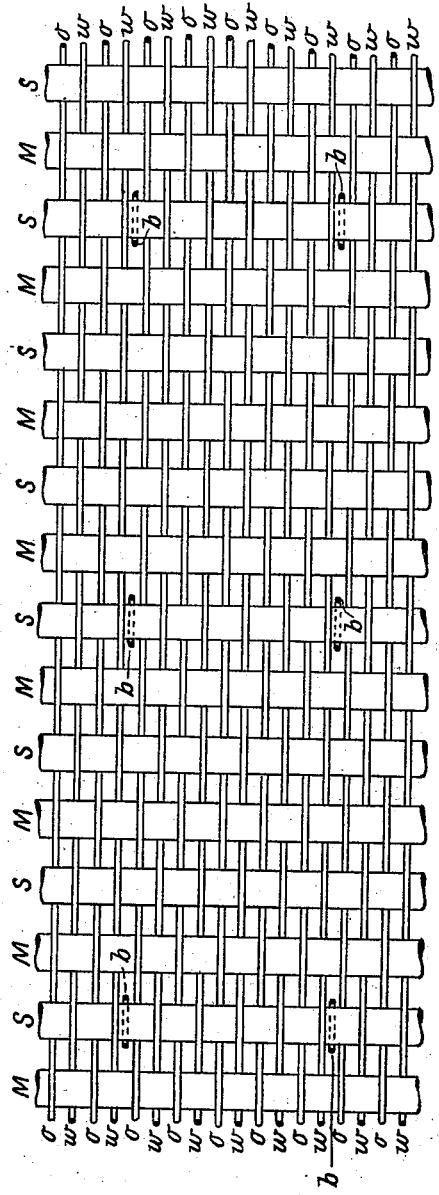
Figure 20:
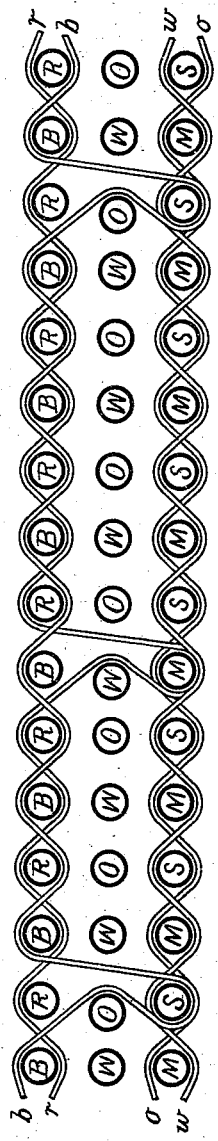

Figures 1 to 15, inclusive, are longitudinal sections or sections taken on planes parallel to the warp-threads and at right angles to the weft-threads, each view showing two sets of weft-threads, and these views showing the fifteen different color effects obtainable in one fabric with one sequence of weft-threads. Fig. 16 is a longitudinal section of the same color effect as in Fig. 1, but with a modified construction of fabric. Fig. 17 is a longitudinal section of the same color effect as in Fig. 2 with the same modified construction of fabric as in Fig. 16. Fig. 18 is a longitudinal section showing the same color effect and construction as Fig. 1 repeated several times with the warp-threads tying the plies at definite intervals. Fig. 19 is a horizontal section taken on the line 19 19 of Fig. 18—that is to say, showing the lower ply with the upper and middle plies removed and the tying warp-threads in section. Fig. 20 is a longitudinal section showing a construction in which the warps of an upper ply divide the work of tying the plies together.

The weft-threads are arranged in sets of six weft-threads each, two sets of weft-threads being shown in each of the first seventeen figures, Figs. 1 to 17, inclusive, and eight sets of weft-threads being shown in Figs. 18, 19, and 20.

The warp-threads are shown arranged in sets of four warp-threads each, one set of warp-threads only being shown in the first eighteen figures, Figs. 1 to 18, inclusive, and in Fig. 20, and nine sets of warp-threads being shown in Fig. 19, except that the one warp-thread which in the color effect shown in Fig. 19, remains in the upper ply, as will be hereinafter described, does not, of course, appear in Fig. 19.

The several weft-threads are indicated in the drawings by the letters B W M R O S, respectively, these letters being the initials of the words "black," "white," "moresque," "red," "olive," and "seadrab," respectively, and the weft-threads will be hereinafter respectively designated by these descriptive words referring to the weft-thread marked with the corresponding initial, and weft-threads may be employed of these colors or of other colors, as desired, and the sequence of weft-threads thrown in weaving the fabrics in all of the sets shown in the drawings is, as above stated, first B, second W, third M, fourth R, fifth O, and sixth S.

In some embodiments of this invention the full range of variations of color in the weft-threads may not be employed—as, for instance, when the first and fourth are of the same color, the second and fifth of the same color, and the third and sixth of the same color—and it is of course evident that the colors may be varied within wide limits in accordance with the requirements of desired patterns.

The several warp-threads are indicated in the drawings by the letters *b w r o*, respectively, these letters being the initials of the words "black," "white," "red," and "olive," respectively, and the warp-threads will be hereinafter respectively designated by these words referring to the warp-thread marked with the corresponding initial, and warp-threads may be employed of these colors or of other colors, as desired, and may contain a less variety of colors in accordance with pattern requirements.

Referring now to the construction and color effect shown in Figs. 1, 18, and 19, it will be seen that in this color effect the black and red wefts appear in the upper plane or ply and the moresque and seadrab wefts in the lower plane or ply, and therefore the color effect on the upper surface of the fabric is black and red and on the lower surface of the fabric moresque and seadrab. Each weft-thread of the upper plane or ply is covered or bound down by a warp-thread of the same color—viz., the black weft by the black warp and the red weft by the red warp—and each weft-thread of the lower ply is bound at its lower surface by a warp-thread of harmonious color—viz., the moresque weft by the white warp and the seadrab weft by the olive warp. The warp-threads of the lower ply in this color effect, as shown, are only interwoven about the weft-threads of the lower ply, and do not leave that ply. One of the warp-threads of the upper ply—the red warp-thread, as shown—remains in that ply interwoven about the weft-threads thereof; but the other warp-thread of that ply—the black warp-thread, as shown—is not only interwoven about the weft-threads of that ply, but also descends at intervals below its ply and passes beneath a weft-thread of the lower ply, (shown as the seadrab weft-thread,) and then returns to the upper ply to cover its weft-thread. One of these tyings is shown in Fig. 1 and three of these tyings in Fig. 18, and, as shown in Fig. 18, the intervals at which these tyings take place longitudinally of the fabric are at every third set of weft-threads, and, as shown in Fig. 19, the intervals transversely of the fabric are at every fifth set of warp-threads, or, as it may be otherwise stated, every fifth black warp-thread is tied around a lower weft-thread in every third set of weft-threads. It is of course evident that these intervals may be greater or less, either transversely or longitudinally of the fabric, as may be desired. As shown, in tying together the two plies the black warp-thread, after binding down an upper-ply black weft-thread, passes over the olive weft-thread of the middle ply, thus separating the olive weft-thread from the red weft-thread of the upper ply and depressing the middle-ply or olive weft-thread, and the black warp-thread then passes below the seadrab weft-thread of the lower ply and then upward and over the black and white weft-threads of the next set, thus separating the middle-ply white weft from the upper-ply red weft and returning to the upper ply to perform its usual duty of binding down the next upper-ply black weft-thread. Thus the tying-loop of the black warp-thread excludes all middle-ply weft-threads and has no tendency to pull such middle ply weft-threads to the upper surface of the fabric, and this loop includes only, in addition to the upper-ply weft-thread red, the lower-ply weft-thread seadrab, and as this lower-ply weft-thread is tightly bound by the warp-threads of the lower ply there is no fear of pulling it to the upper ply. Thus the upper-ply warp-thread is enabled to perform the work of tightly binding the plies together without material displacement of any weft-thread.

It is of course evident that the tying together of the two plies by passing a warp-thread from one outer ply to the other outer ply and binding a weft-thread of that ply and returning again may be accomplished in various other ways—as, for instance, as shown in Fig. 16, where the color effect is the same as in Figs. 1, 18, and 19; but the plies are tied together by the white warp-thread of the lower ply, which, after passing under and binding a moresque weft-thread, passes upward and over the red weft-thread of the upper ply and then back again to the lower ply to bind the next moresque weft-thread in the lower ply, and as also shown in Fig. 17, in which the color effect is the same as in Fig. 2 and the construction of fabric the same as in Fig. 16.

Figure 11:
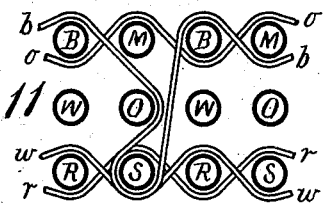
Figure 12:
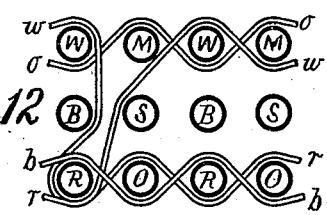
Figure 13:
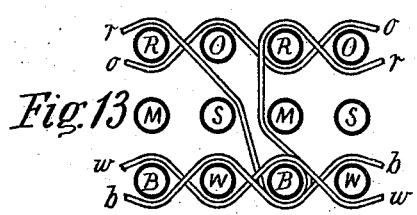
Figure 14:
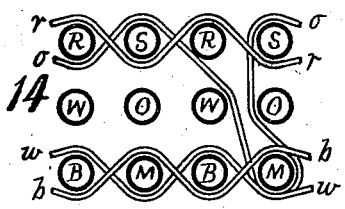
Figure 15:
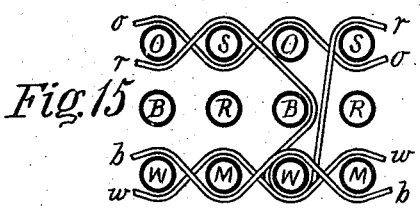

In the different color effects, of which is shown on both face and back of the fabric the full number possible with six different colors of weft-threads thrown in the sequence above stated, different warp-threads will be interwoven about the weft-threads of the upper ply and the tying may be accomplished by different warp-threads—as, for instance, the tying-warp is the black warp in Figs. 1, 3, 5, 8, 10, and 11, the white warp in Figs. 2, 6, 7, and 12, the red warp in Figs. 13 and 15, and the olive warp in Figs. 4, 9, and 14. So, also, if desired, where one color effect is many times successively repeated the two warp-threads of one outer ply may divide the work of tying the plies together. This is particularly shown in Fig. 20, illustrating repetitions of the black and red color effect, in which the first tying shown is effected by the black warp of the upper ply, the second tying by the other or red warp of the upper ply, and the third tying by the black warp again, and thus, throughout the continuance of this color effect black and red, the warps black and red may be alternately used for tying the plies together.

In weaving a carpet the color effects will be combined to produce the desired pattern, and the plies will be tied together by the passage of threads from one to the other outer ply; but in my improved fabric this tying of the plies will frequently not accompany a change of pattern—as, for instance, in the construction shown—when a change is made transversely of the fabric from one to the other of the three color effects black and white, Fig. 10, black and moresque, Fig. 11, and white and moresque, Fig. 12, or from one to another of the three color effects red and olive, Fig. 13, red and seadrab, Fig. 14, and olive and seadrab, Fig. 15, or from one to the other of the two color effects black and red, Fig. 1, and black and white, Fig. 10, or from one to the other of the two color effects moresque and olive, Fig. 9, and black and moresque, Fig. 11, or from one to the other of the two color effects white and seadrab, Fig. 7, and white and moresque, Fig. 12, or from one to the other of the two color effects moresque and red, Fig. 8, and red and olive, Fig. 13, or from one to the other of the two color effects white and seadrab, Fig. 7, and red and seadrab, Fig. 14, or from one to the other of the two color effects black and olive, Fig. 4, and olive and seadrab, Fig. 15, as at these changes no weft-thread passes from one to the other of the outer plies. So, also, in my improved fabric the tying of the plies from a change of pattern will frequently not take place as the result of a change of pattern longitudinally of the fabric, as in the construction shown when the change is from one to another of the three effects black and red, Fig. 1, moresque and seadrab, Fig. 3, and moresque and red, Fig. 8, or from one to another of the three color effects white and olive, Fig. 2, white and seadrab, Fig. 7, and white and moresque, Fig. 12; or from one to another of the four color effects black and olive, Fig. 4, black and seadrab, Fig. 5, moresque and olive, Fig. 9, and black and moresque, Fig. 11, or from one to another of the three color effects red and olive, Fig. 13, red and seadrab, Fig. 14, and olive and seadrab, Fig. 15, as at these changes no warp-thread passes from one to the other of the outer plies. Therefore wherever a single color effect is many times repeated, as to form the ground or background of any pattern, or in any large blocks of color in a pattern, or wherever the changes of pattern are as above enumerated no tying of the plies will take place other than the periodic tying above described; but at many changes of pattern a tying of the plies will occur, and this may be taken account of in cutting the Jacquard cards or otherwise preparing or adjusting the Jacquard mechanism or other part of a loom for the weaving operation, and the periodic tyings may be omitted at those places in the fabrics where the tyings resulting from pattern changes will accomplish a satisfactory uniting of the plies.

From the above description and the drawings the construction of the fabric in the embodiments of my invention shown will be well understood, and the required adjustment and operation of a loom for the production of the fabric will be evident to those skilled in the art. I shall now, therefore, particularly describe only the adjustment of warps and throwing of weft-shuttles for the production of the color effect shown in Fig. 1. The first weft-thread thrown is black, and when this weft is thrown the warp-threads are adjusted with the black warps up and the white, red, and olive warps down. The second weft-thread thrown is white, and when this weft is thrown the red warps have been raised, and thus the black and red warps are up and the white and olive warps down, and the white weft is separated from the black weft by the red warps. The third weft-thread is moresque, and when this weft is thrown the olive warps have been raised, and thus the black, red, and olive warps are up and the white warp down, and the moresque weft is separated from the white weft by the olive warps. The fourth weft-thread is red, and when this weft is thrown the black and olive warps have been lowered, and thus the red warps are up and the black, white, and olive warps are down. The crossing of the warps black and red, which took place before this fourth shot, completed or closed the shed of the black weft, and the black warps separate the red weft from the white weft. The fifth weft-thread is olive, and when this weft is thrown the black warps have been raised, and thus the black and red warps are up and the white and olive warps are down and the olive weft is separated from the red weft by the black warps. The sixth weft-thread is seadrab, and when this weft is thrown the black warps have been lowered and the white warps raised, and thus the red and white warps are up and the black and olive warps are down. The crossing of the white and olive warps has completed or closed the shed of the moresque weft. The seadrab weft is separated from the olive weft by the white warps, and the black warps have passed under the seadrab weft to tie the plies together.

It is of course to be noted, as above fully explained, that the passing of the black warp under the lower-ply weft seadrab will not usually take place as to every black warp throughout the width of the fabric; but this tying will be effected at definite intervals, as in every fifth set of warps, or by every fifth black warp-thread, as shown in Fig. 19, and that at all other places in the width of the fabric the black warps will be in upper position when the sixth weft-shot seadrab is made. The first shot of the next set is of course black, and the adjustment of warps for this shot is the same as for the corresponding shot in the first set—that is to say, the black warps have been raised and the white and red warps lowered—and thus the black warps are up and the white, red, and olive warps are down. The crossing of the black and red warps completes or closes the shed or loop of the red weft of the first set, and, as will be seen, this loop excludes all middle-plane wefts and includes, only in addition to the upper-ply weft red, the lower-ply weft seadrab. The second, third, fourth, and fifth shots, white, moresque, red, and olive, respectively, are in all respects the same as the corresponding shots in the first set. When the olive warps are raised prior to the third shot, (moresque,) the crossing of the white and olive warps completes or closes the shed for the sixth weft (seadrab) of the first set, and thus the outer wefts of the first set are completely tied in their respective plies, and, as will be seen, all the loops of warps, including the outer wefts, exclude the middle wefts, (white and olive.) When the sixth shot (seadrab) of the second set is made, the black warps are up, and therefore in this second set the black warps are not tied around the lower-ply weft-thread, (seadrab,) but pass only beneath the upper-ply weft-thread, (red.) As aforesaid, the sequence of weft-threads is the same throughout all the drawings, and the adjustments of warp-threads for the production of any construction shown may therefore be readily determined from inspection of the drawings.

It is evident that in the various applications of my invention many modifications will be made in the construction above described, and shown in the drawings, and that various combinations and colorings will be employed. I do not, therefore, limit my invention to the particular construction shown; but

What I claim, and desire to secure by Letters Patent, is—

1. An ingrain carpet fabric composed of figuring weft threads and figuring warp threads and having the weft threads arranged in sets of six weft threads each and the warp threads arranged in sets having a less number in a set than the weft threads, and having the weft threads arranged in three planes or plies, each ply containing two weft threads of a set, two of the warp threads of a set being interwoven with the upper ply weft threads to form one outer ply and two other warp threads of a set being interwoven with the lower ply wefts to form the other outer ply, and these outer plies being tied together at intervals in addition to any tyings resulting from pattern changes, each such tying at intervals being effected by a warp thread passing from one outer ply to the other outer ply and binding the weft thread of that ply in addition to the ordinary binding thereof, and then returning to the former ply, said tying loop excluding all middle ply wefts, substantially as set forth.

2. An ingrain carpet fabric composed of figuring weft threads and figuring warp threads and having the weft threads arranged in sets of six weft threads each and the warp threads arranged in sets of four warp threads each, and having three weft planes or plies, each plane or ply containing two weft threads of a set, two of the warp threads of a set being interwoven with the upper ply weft threads to form one outer ply, and the remaining two warp threads of a set being interwoven with the lower ply weft threads to form the other outer ply, and these outer plies being tied together at intervals by a warp thread looped from one outer ply over a weft of the other outer ply, said loop excluding all middle ply wefts, substantially as set forth.

3. In an ingrain capet fabric the combination with weft threads arranged in sets of six weft threads each, of warp threads arranged in sets of four warp threads each, two of which weft threads are in the upper plane or ply, two in the lower plane or ply and two in the middle plane or ply, the weft threads of the upper ply being interwoven with two of the warp threads of a set to form one outer ply and the weft threads of the lower ply being interwoven with the remaining two warp threads of a set to form the other outer ply, and these outer plies being tied together at intervals by a warp thread passing from the upper ply over a middle ply weft and then under a lower ply weft and then upward to bind the proper weft thread in the upper ply, substantially as set forth.

This specification signed and witnessed this 20th day of April, 1895.

THOMAS BENTON DORNAN.

In presence of—
   GEO. W. GOLDEN,
   MILLARD F. SHOCK.